Jan. 9, 1951  P. STALTARE  2,537,378
ROTARY BROILER

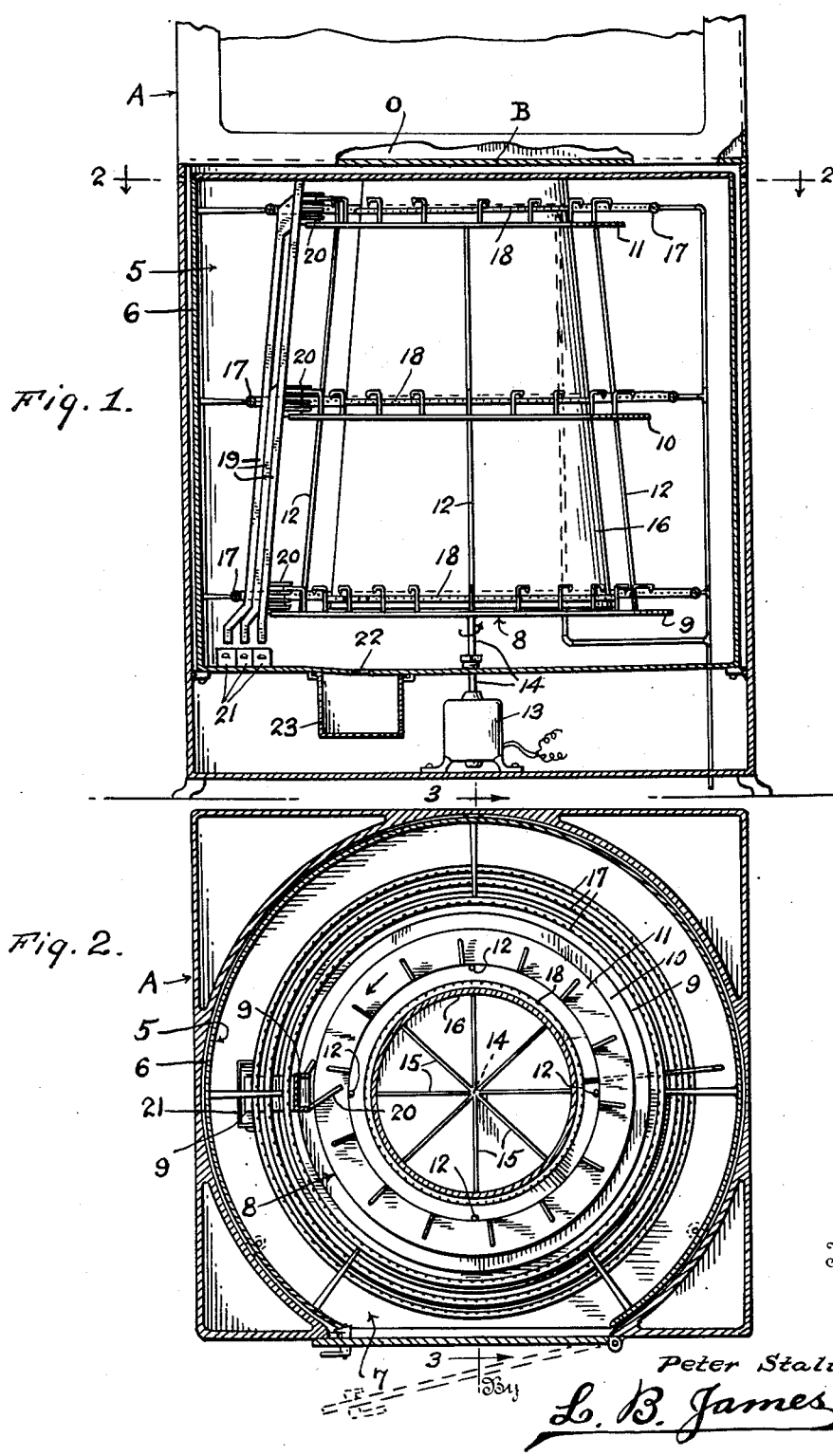

Filed June 6, 1947  2 Sheets—Sheet 2

Inventor
Peter Staltare
By L. B. James
Attorney

Patented Jan. 9, 1951

2,537,378

UNITED STATES PATENT OFFICE 2,537,378

ROTARY BROILER

Peter Staltare, Somerville, Mass.

Application June 6, 1947, Serial No. 753,014

1 Claim. (Cl. 99—393)

This invention relates to the official class of stoves and cooking apparatuses and more particularly rotary broilers.

One of the objects of this invention resides in the provision of a rotary broiler adapted to produce different kinds of broiling and toasting.

Another object of this invention resides in the manner of assembling the broiler in a stove.

A further object of this invention resides in the particular construction of the broiler.

A still further object of this invention resides in the particular construction of the rotary meat shelves.

Aside from the aforesaid objects this invention resides in the means for removing the cooked meats from the shelves and depositing them in the food pan.

One of the salient features of this invention resides in the provision of means whereby the meat is cooked on both sides during a partial rotation of the meat supporting shelves.

With these and other objects in view, this invention resides in certain novel features of construction and arrangement of elements to be hereinafter more particularly set forth in the specification, illustrated in the accompanying drawings and pointed out in the appended claim and, although this disclosure depicts my present conception of the invention, the right is reserved to resort to such departures therefrom as come within the spirit of the invention.

In the accompanying drawings forming a part of this application:

Fig. 1 is a front view of a stove partly in section showing the broiler therein.

Fig. 2 is a horizontal sectional view taken approximately on line 2—2 of Fig. 1.

Figure 3:
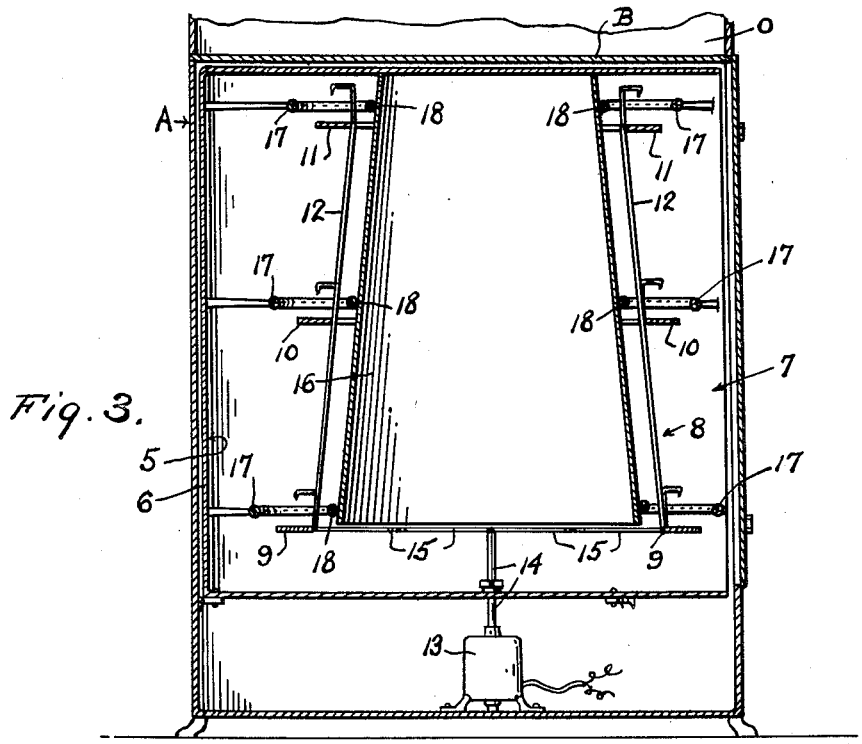
Fig. 3 is a vertical sectional view taken approximately on line 3—3 of Fig. 2.
Figure 4:
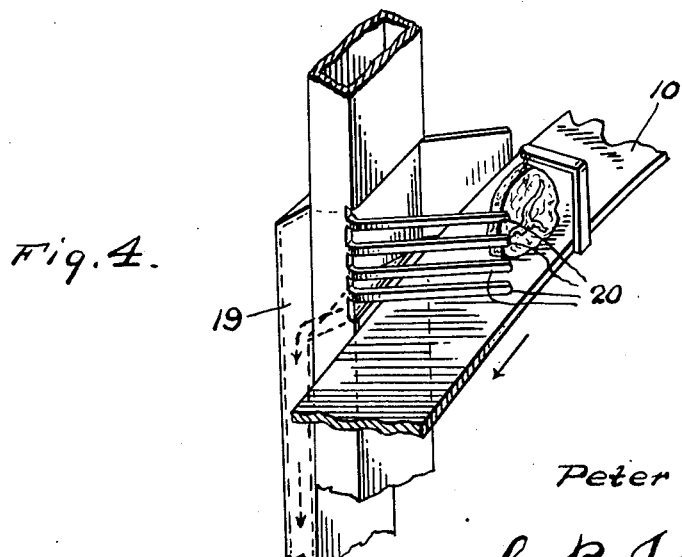
Fig. 4 is a detail view of a portion of one of the shelves and meat removing forks associated therewith.

In the present illustration of this invention the letter A designates a cook stove which among other well known elements consists of an oven O having a bottom B below which is secured, in any suitable manner, a rotary broiler indicated, in general, by the numeral 5.

The broiler 5 consists of an outer cylindrical casing 6 having an opening 7 in its front to form a doorway through which meat or other products to be cooked are deposited on a rotor 8 therein.

The rotor 8 is herein disclosed as formed of three vertically disposed ring shaped shelves 9, 10 and 11 retained in spaced relation by wire standards 12 or other suitable supports and operated by a motor 13 disposed below the cylindrical casing 6 with its shaft 14 connected to the lower ring shaped shelf 9 by spokes 15 or other suitable elements of skeleton construction.

Disposed within the ring shaped shelves 9, 10 and 11 in spaced relation to their inner edges is a cylinder 16 having its lower end disposed above the spokes 15 of the rotor and its upper end secured to the bottom of the oven so as to retain it in stationary and axial relation to the rotor.

Suitably secured on the inner surface of the cylindrical casing and outer periphery of the cylinder 16 are gas burners 17 and 18, the former of which directs heat from the flames of gas thereof to the outer areas of meat deposited on the rotating shelves, while the latter of which directs heat to the inner areas of the meat while rotating therebetween.

Secured adjacent the outer edges of the rotating shelves are chutes 19 supporting fork shape or other suitable forms of fingers 20 adapted to remove and convey cooked meats from the shelves to the food pan 21 removably supported on the bottom of the casing. Said fingers and chutes are preferably disposed at a point in the casing whereby meats on the shelves will be removed when they have traversed approximately three-quarters of their rotation from the point of first contact by the heat from the burners, however, it is within the purview of this invention to subject the meats or other products on the shelves to longer or shorter periods of cooking by otherwise arranging the chutes and fingers around the shelves.

Formed in the bottom of the cylindrical casing is an aperture 22 adapted to permit grease to escape into a grease pan 23 therebeneath.

With this invention fully described, it is manifest that a rotary broiler is provided with which different kinds of broiling and toasting is permitted and, through the particular construction and arrangement of the elements set forth, operation thereof is automatic.

Having thus described my invention, what I claim and desire to protect by Letters Patent is:

A rotating broiler comprising a stationary outer casing having a door opening therein, a door hingedly secured over the door opening, a substantially cylindrical inner casing secured to said outer casing and having an opening therein in opposed relation to said door opening, a substantially cone-shaped cylinder rigidly secured to and suspended centrally from the top wall of the inner casing, a ring-shaped shelf of greater diameter than the cone-shaped cylinder axially disposed therebelow, radially extending spokes secured to the inner periphery of said shelf, an electric motor secured to the bottom of said outer casing and having its shaft extending through the bottom of the inner casing and connected to said spokes at their centrally disposed point of intersection, other vertically spaced ring-shaped shelves of greater diameter than said cone-shaped cylinder and diminishing toward the top of the inner casing disposed around the same, upwardly converging stiff wire standards connected to the inner edges of said shelves and rigidly retaining them in vertical spaced relation to one another, chutes disposed in close proximity to the outer edges of said shelves with inlet holes therein extending upwardly from those horizontal planes occupied by the upper surfaces of the shelves, meat engaging prongs secured to the inner edges of the shelves and overhanging the same, vertically spaced meat removing fingers secured to the chutes at the far sides of the openings therein with their outer ends extending inwardly over the shelves and in the paths of meat suspended from said meat engaging prongs, and meat broiling ring-shaped burners diminishing in diameter toward the top of the inner casing spaced equi-distance from the outer edges of the shelves.

PETER STALTARE.

REFERENCES CITED

The following references are of record in the file of this patent:

UNITED STATES PATENTS

| Number | Name | Date |
|---|---|---|
| 814,540 | Higbee | Mar. 6, 1906 |
| 1,471,275 | Moneuse | Oct. 16, 1923 |
| 1,473,213 | De Matteis | Nov. 6, 1923 |
| 1,599,556 | Cook | Sept. 14, 1926 |

FOREIGN PATENTS

| Number | Country | Date |
|---|---|---|
| 107,810 | Australia | July 6, 1939 |